(12) United States Patent
Fleming (10) Patent No.: US 8,068,495 B2
(45) Date of Patent: Nov. 29, 2011

(54) MECHANISMS FOR DATA RATE IMPROVEMENT IN A WIRELESS NETWORK

(75) Inventor: Kristoffer Fleming, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1532 days.

(21) Appl. No.: 11/236,091

(22) Filed: Sep. 27, 2005

(65) Prior Publication Data

US 2007/0071034 A1    Mar. 29, 2007

(51) Int. Cl.
*H04L 12/56* (2006.01)
(52) U.S. Cl. .................. 370/392; 370/401; 370/474
(58) Field of Classification Search .................. None
See application file for complete search history.

(56) References Cited

U.S. PATENT DOCUMENTS

| | | | |
|---|---|---|---|
| 6,141,705 A | 10/2000 | Anand | |
| 6,480,489 B1 | 11/2002 | Muller et al. | |
| 6,603,744 B2 | 8/2003 | Mizutani et al. | |
| 6,633,583 B1 | 10/2003 | Esterson | |
| 6,804,240 B1 | 10/2004 | Shirakawa et al. | |
| 6,879,597 B2* | 4/2005 | Tordera et al. | 370/463 |
| 6,904,519 B2 | 6/2005 | Anand et al. | |
| 7,180,911 B1* | 2/2007 | Blankenship et al. | 370/473 |
| 7,209,470 B2* | 4/2007 | McGowan | 370/349 |
| 7,239,630 B1* | 7/2007 | Lim et al. | 370/353 |
| 7,359,405 B2* | 4/2008 | Chan et al. | 370/474 |
| 7,558,873 B1* | 7/2009 | Maufer | 709/237 |
| 2003/0043771 A1 | 3/2003 | Mizutani et al. | |
| 2003/0081630 A1* | 5/2003 | Mowery et al. | 370/466 |
| 2003/0182614 A1* | 9/2003 | Schroeder | 714/776 |
| 2003/0210673 A1 | 11/2003 | Nishimura | |
| 2004/0083308 A1 | 4/2004 | Sebastian et al. | |
| 2004/0123142 A1 | 6/2004 | Dubal et al. | |
| 2005/0013345 A1* | 1/2005 | Choi | 375/130 |
| 2005/0083968 A1 | 4/2005 | Chan et al. | |
| 2007/0071034 A1 | 3/2007 | Fleming | |
| 2008/0016511 A1* | 1/2008 | Hyder et al. | 718/105 |

FOREIGN PATENT DOCUMENTS

| | | |
|---|---|---|
| CN | 101273603 A | 9/2008 |
| DE | 112006002410 T5 | 7/2008 |
| EP | 1515473 A2 | 3/2005 |
| GB | 2444008 A | 5/2008 |
| HK | 1124703 A | 7/2009 |
| JP | 11112524 A | 4/1999 |

(Continued)

OTHER PUBLICATIONS

"Method for a Short Range Wireless, PC Card Interface or USB Adapter for Using the Laptop/PC As a Speakerphone/Dialer With Specialized Wireless Phones", IP.COM Journal, IP.COM Inc., (Jul. 13, 2004).

(Continued)

*Primary Examiner* — Robert Scheibel
(74) *Attorney, Agent, or Firm* — Grossman, Tucker, Perreault & Pfleger, PLLC (57) ABSTRACT

A wireless network arrangement includes a host device in communication with a wireless network module (e.g., an ultrawideband (UWB) module, etc.) through a universal serial bus (USB). A protocol is provided to support communication over the USB between the host and the module. In at least one embodiment, the host is able to offload network packet header processing functions to the wireless network module via the USB.

12 Claims, 7 Drawing Sheets

FOREIGN PATENT DOCUMENTS

| | | | |
|---|---|---|---|
| JP | 2002517855 | A | 6/2002 |
| JP | 2003324445 | A | 11/2003 |
| JP | 2005153186 | A | 6/2005 |
| WO | 99/64952 | A1 | 12/1999 |
| WO | WO-2007038577 | A2 | 4/2007 |
| WO | WO-2007038577 | A3 | 4/2007 |

OTHER PUBLICATIONS

International Search Report and Written Opinion for PCT Patent Application No. PCT/US2006/037638, mailed on Apr. 4, 2007, 16 pages.

Partial International Search Report for PCT Patent Application No. PCT/US2006/037638, mailed on Jan. 17, 2007, 4 pages.

International Preliminary Report on Patentability and written opinion for PCT Patent Application No. PCT/US2006/0379638, mailed on Apr. 10, 2008, 9 pages.

Office Action for German Patent Application No. 11 2006 002 410.8, mailed on Jan. 12, 2010, 4 pages of English Translation and 4 pages of Office action.

Office Action for Japanese Application No. 2008-529379, mailed on Jan. 11, 2011, 4 pages.

Office Action for GB Patent Application No. 0805041.1, mailed on Feb. 23, 2010, 4 pages.

Office Action for Chinese Application No. 200680035292.6, mailed on Sep. 26, 2010, 20 pages.

\* cited by examiner

MECHANISMS FOR DATA RATE IMPROVEMENT IN A WIRELESS NETWORK

TECHNICAL FIELD

The invention relates generally to communications and, more particularly, to techniques for providing wireless networking functionality for a host device.

BACKGROUND OF THE INVENTION

Wireless network devices often include a host device to which wireless communication functionality is added. For example, a laptop computer can become a wireless network device by installing a wireless network interface card (NIC) into one of the computer's available I/O slots. External wireless networking functionality may also be connected to a host device. Many wireless networking technologies are packet based. That is, data is transmitted between communication entities in relatively small units, known as packets. The size of the packets may be selected, for example, to achieve efficient routing of the packets through the network. When a data file, for example, is to be transmitted through a packet based network, the data file is first divided into a number of packets. Each of the packets may include, in a header portion thereof, a sequence number identifying the packet's position in the original file and a destination address identifying the node that is the final destination of the packets. Other information may also occur within the packet headers. After the packets associated with a communication operation have been received by a destination node in the network, the packets may be reassembled into the corresponding file.

In a wireless network device, the packet processing is typically performed in the host processor. In many systems, this packet processing can occupy a large percentage of the available computational resources of the host processor, which can leave inadequate resources for other functions of the host device. As will be appreciated, this burden on the host processor can significantly slow down the overall operation of the host device for both the communication activity and the other functions of the host. One technique for reducing the burden on the host processor is to offload one or more of the functions of the host processor to another processor associated with the host device. In past systems, such offloading has been done across bus structures that utilize direct memory access (DMA). There is need for techniques and structures that enable packet processing functions to be offloaded by a host across bus structures that are packet-based, such as a universal serial bus (USB).

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
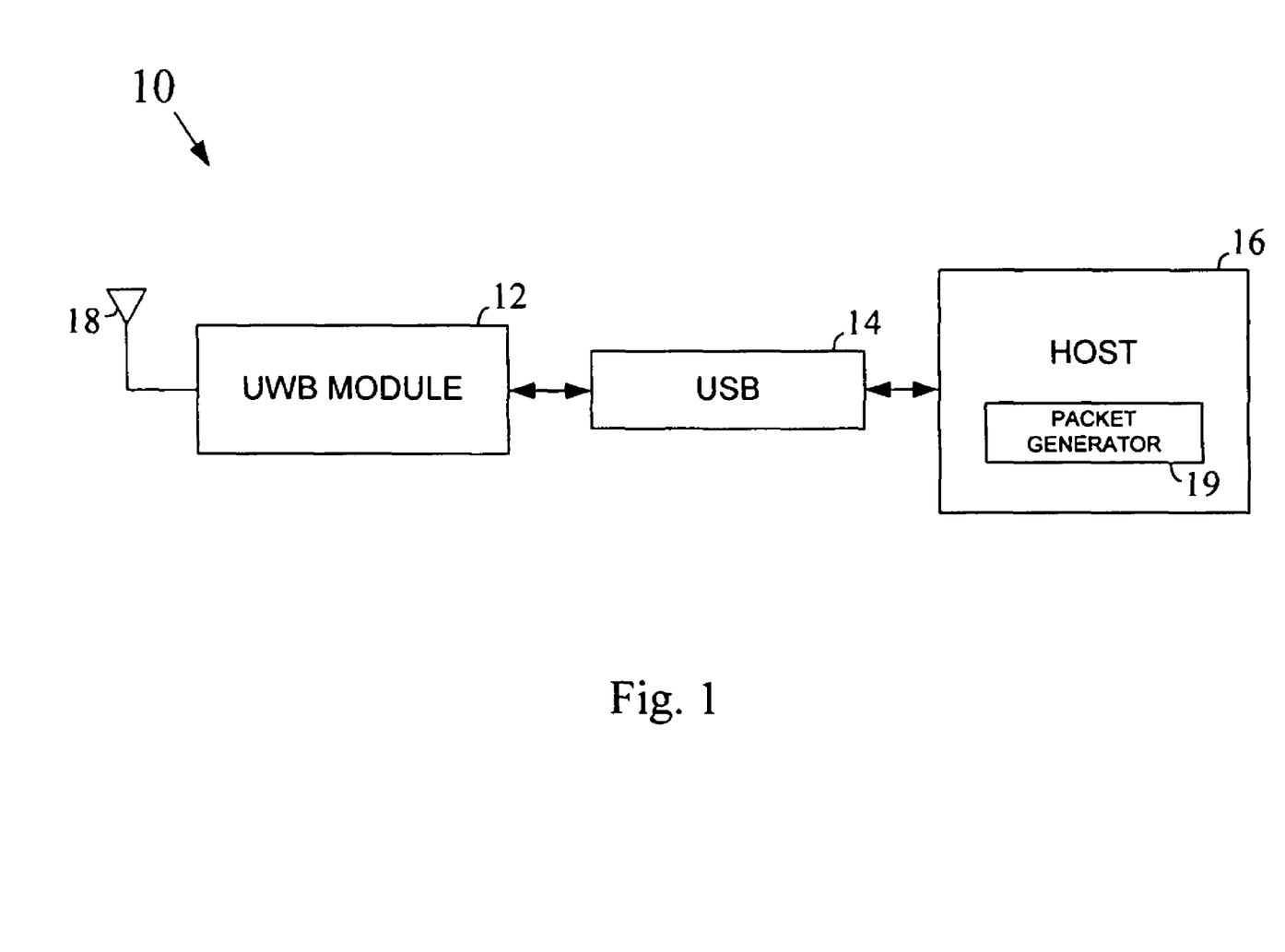
FIG. 1 is a block diagram illustrating an example arrangement for use in providing wireless network connectivity for a host device in accordance with an embodiment of the present invention.

FIG. 1 is a block diagram illustrating an example arrangement 10 for use in providing wireless network connectivity for a host device in accordance with an embodiment of the present invention. As illustrated, the arrangement 10 includes: an ultrawideband (UWB) module 12, a universal serial bus (USB) 14, and a host device 16. The host device 16 may include any type of device for which access to a wireless network might be desired including, for example, a personal computer, a personal digital assistant (PDA), a cellular telephone or other handheld wireless communicator, a computer peripheral, an audio/video or multimedia component, a video game machine, a camera, and/or others. The UWB module 12 is a device through which the host 16 may access the wireless network, using UWB modulation. The USB bus 14 is a standard bus structure through which the host 16 may communicate with the UWB module 12. Any version of USB may be used including, for example, USB 2.0 and others. The UWB module 12 may be coupled to one or more antennas 18 to facilitate the transmission and/or reception of wireless signals. Any type of antenna(s) may be used including, for example, a dipole, a patch, a helical antenna, an antenna array, and/or others.

UWB is a wireless communication technology in which digital data is transmitted in very short duration pulses over a very wide bandwidth using relatively low power. UWB has been defined as any radio technology having a spectrum that occupies a bandwidth greater than 20 percent of the center frequency, or a bandwidth of at least 500 MHz. The wide bandwidths may be achieved using techniques such as, for example, orthogonal frequency division multiplexing (OFDM), direct sequencing, and/or others. UWB technology has the ability to transfer large amounts of data at relatively high speed while causing little or no interference with surrounding radio systems. UWB is typically used as a short-range wireless technology for use in, for example, personal area networks (PANs). In at least one embodiment of the invention, a version of UWB is used that is specified in the "Multiband OFDM Physical Layer Proposal for IEEE 802.15.3a (Sep. 14, 2004)" developed by the Multiband OFDM Alliance SIG.

As described above, the UWB module 12 allows the host device 16 to communicate within other communication entities within an UWB network (e.g., a PAN). In some versions of UWB, packets are allowed to have packet lengths of up to 4 kilobytes (kB). The USB bus 14, on the other hand, only allows a maximum packet length of 512 bytes for high speed bulk endpoints (and only 64 bytes for full speed endpoints). The UWB module 12, therefore, may include segmentation and reassembly functionality to process packets during transmit and receive operations. For example, during a transmit operation, the UWB module 12 may combine the contents of multiple USB packets received from host 16, via the USB 14, to generate a network packet to be transmitted from antenna 18 into the UWB channel. During a receive operation, the UWB module 12 may segment a packet received from the UWB channel to generate multiple USB packets for delivery to the host 16, via USB 14. The UWB module 12 may also have the ability to support offloaded packet processing functions of the host 16. That is, the host 16 may offload processing of the network headers to the UWB module 12 across the USB 14. Types of network headers may include, for example, internet protocol (IP) headers, internet protocol version 6 (IPv6) headers, transmission control protocol (TCP) headers, user datagram protocol (UDP) headers, real time transport protocol (RTP) headers, medium access control (MAC) headers, and/or others. By offloading the packet header processing to the UWB module 12, the computational load on the processor within the host device 16 may be reduced considerably and overall processing and communication speed may be enhanced. In addition, power consumption may be reduced within the host processor. In one aspect of the present invention, a new communication protocol is provided to govern communication between the UWB module 12 and the host 16, across the USB 14. In at least one embodiment, the UWB module 12 is capable of supporting wireless USB operation as well as one or more networking protocols (e.g., IP, TCP, and/or others).

Figure 2:
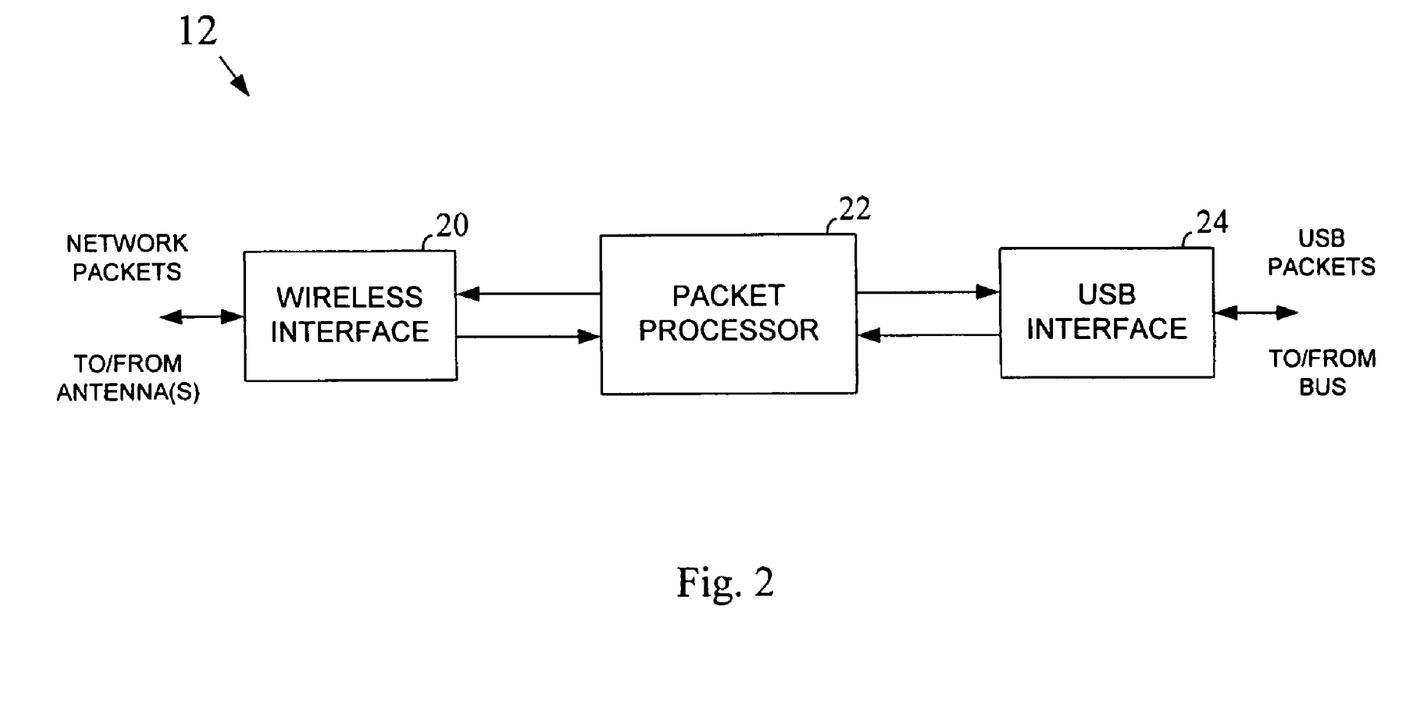
FIG. 2 is a block diagram illustrating example functionality within an UWB module in accordance with an embodiment of the present invention.

FIG. 2 is a block diagram illustrating example functionality within the UWB module 12 of FIG. 1 in accordance with an embodiment of the present invention. As illustrated, the module 12 includes: a wireless interface 20, a packet processor 22, and a USB interface 24. The wireless interface 20 provides an interface between the module 12 and the UWB channel. The wireless interface 20 may include, for example, a wireless transmitter, a wireless receiver, an UWB modulator/demodulator, and/or other circuitry required to generate UWB transmit signals and process UWB receive signals. The USB interface 24 provides an interface between the module 12 and the USB connecting the module to the host. The packet processor 22 provides the processing necessary for converting the USB packets to network packets during transmit operations and converting network packets to USB packets during receive operations. In at least one embodiment, the packet processor 22 is capable of performing packet header processing functions offloaded by the host 16. The packet processing functionality within the UWB module 12 may be implemented in software, hardware, firmware, or a combination of the above. In at least one implementation, to achieve an enhanced processing speed, a hardware/firmware implementation is provided. In at least one embodiment, the packet processor 22 is implemented as an application specific integrated circuit (ASIC).

It should be appreciated that features of the invention are not limited to use within UWB-based wireless networks. That is, aspects of the invention may be used in connection with other packet-based wireless networking technologies. In such cases, the wireless interface 20 of FIG. 2 may be configured to operate in accordance with the alternative wireless scheme(s) (e.g., IEEE 802.11a,b,g; HiperLAN Type1, 2; Bluetooth, HomeRF, etc.) and the UWB module 12 could be renamed wireless module 12. The processing performed within the packet processor 22 may also be adapted in accordance with the corresponding wireless standard (e.g., to generate the appropriate packet length and packet headers, to calculate the correct checksum values, etc.).

Figure 3:
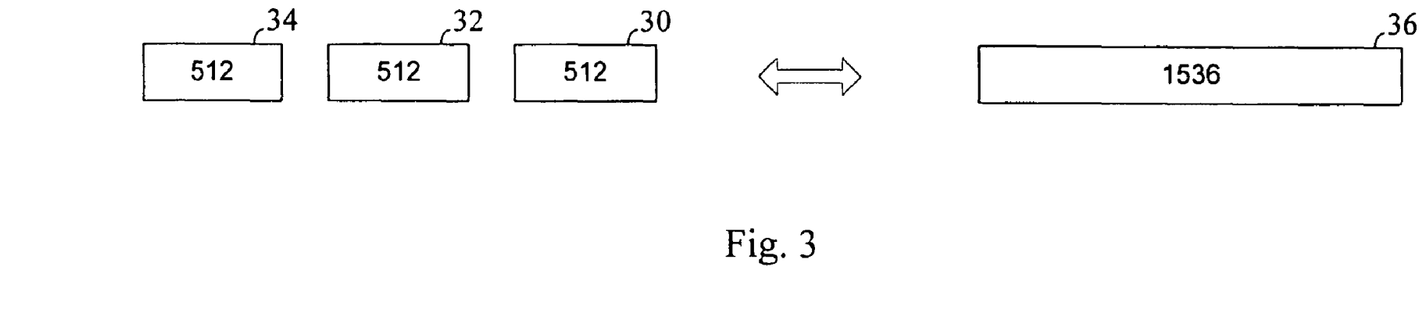
FIGS. 3 and 4 are signal diagrams illustrating packet reassembly and segmentation functions that may be implemented within an UWB module in accordance with an embodiment of the present invention.
Figure 4:
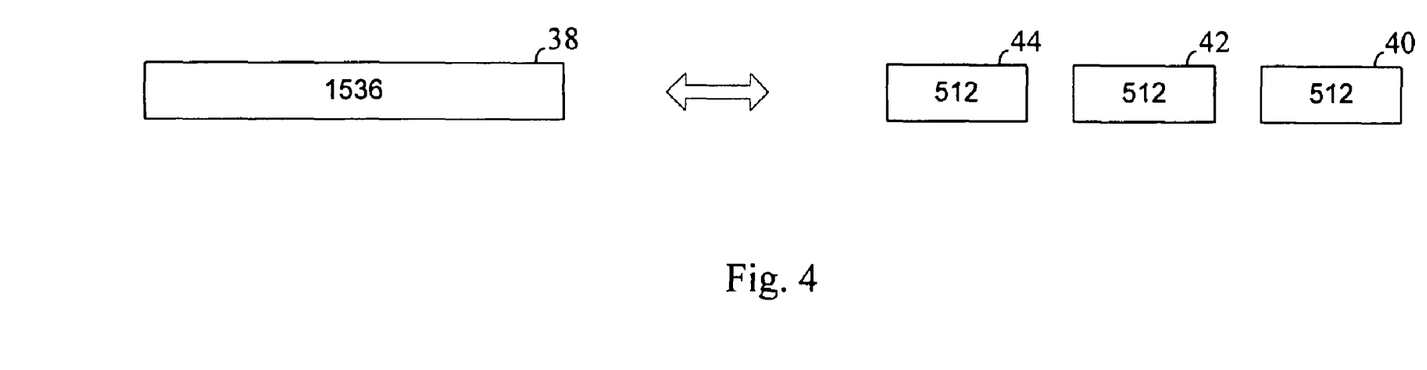

FIGS. 3 and 4 are signal diagrams illustrating the packet assembly and segmentation functions that may be implemented by the UWB module 12 in accordance with an embodiment of the present invention. FIG. 3 illustrates the assembly of a single network packet 36 from a number of USB packets 30, 32, 34 received from a host. That is, referring back to FIG. 1, the host 16 transmits packets 30, 32, and 34 onto the USB 14 for transmission to a remote wireless entity in the UWB network. The packets are limited in length to 512 bytes on the USB bus 14. The packet processor 22 of FIG. 2 assembles the three USB packets 30, 32, 34 into a single network packet 36 having a length of 1536 bytes. As described previously, the maximum packet length in certain UWB networks may be 4 kB. Thus, in at least one embodiment, the packet processor 22 may assemble as many USB packets (addressed to a particular node) as possible into a network packet, up to the 4 kB maximum (or some other maximum length). If the wireless interface 20 of FIG. 2 is capable of supporting multiple different wireless protocols, each having a different maximum packet length, then the packet processor 22 will need to determine the protocol being used for a particular transmit operation and use the associated maximum packet length information when determining how to assemble USB packets for wireless transmission. In at least embodiment, the USB packets received by the UWB module 12 from the USB 14 will identify the networking protocol(s) being used.

FIG. 4 illustrates the segmentation of a single network packet 38 into a number of USB packets 40, 42, 44. Again, the network packet is 1536 bytes and the USB packets 40, 42, 44 are 512 bytes each. Anytime a network packet is received by the UWB module 12 from the wireless medium that exceeds the maximum packet length of the USB, the network packet may be segmented into portions that are in conformity with the bus packet length constraints. The host 12 will be configured to appropriately reassemble the segmented packets upon reception. With reference to FIG. 1, the host 16 may also include a packet generator 19 to generate USB packets for delivery to the UWB module 12, via USB 14, during transmit operations.

Figure 5:
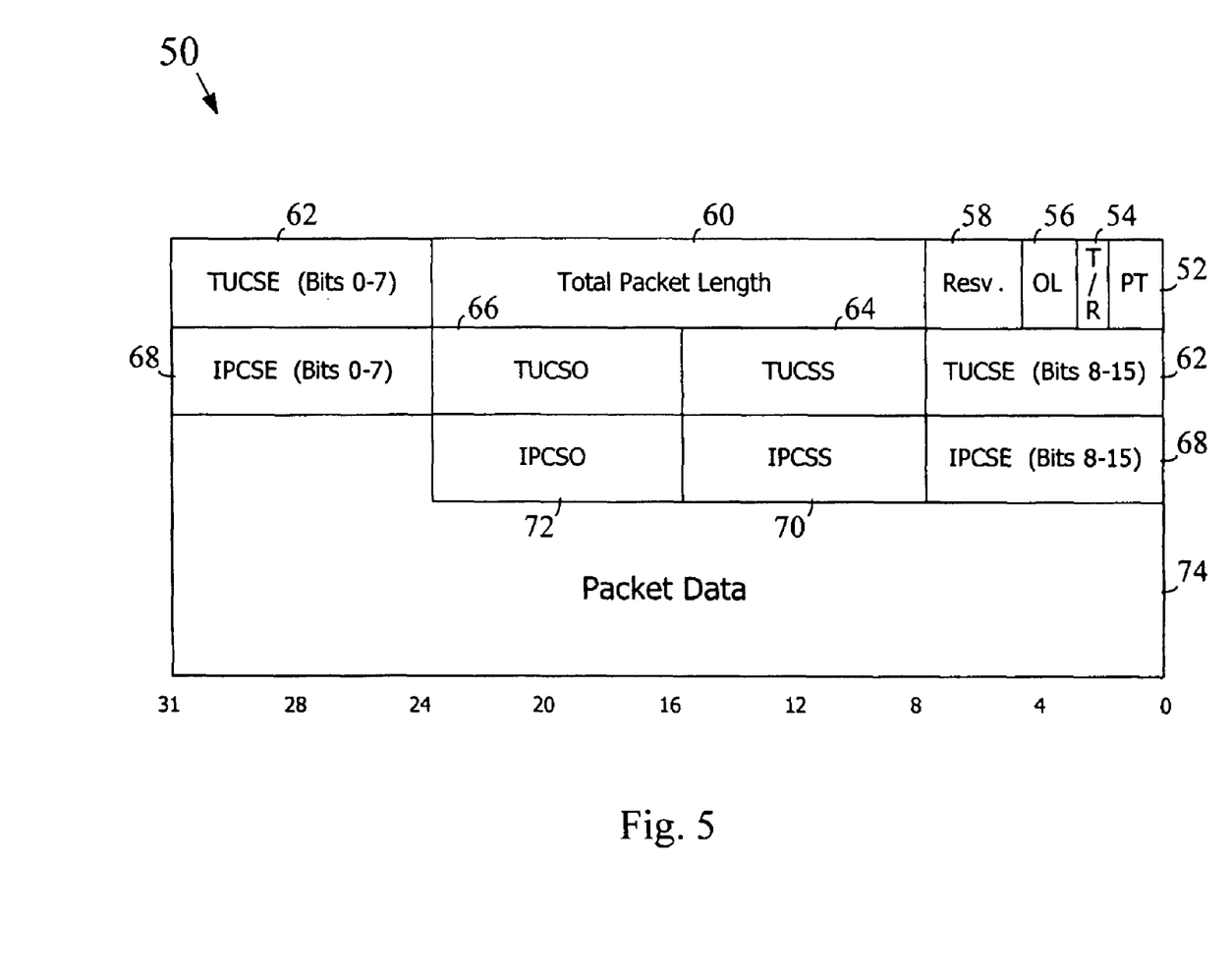
FIG. 5 is a diagram illustrating an example packet format that may be used for communication across a USB bus between a host device and an UWB module in accordance with an embodiment of the present invention.

Referring back to FIG. 1, a communication protocol has been developed for use in structuring the communication between the host 16 and the UWB module 12 across the USB 14. The protocol supports the offloading of packet processing for the network headers to functionality within the UWB module 12. The protocol also supports the assembly and segmentation of network packets during transmit and receive operations. FIG. 5 is a diagram illustrating an example packet format 50 that may be used by the communication protocol across the USB bus 14 in accordance with an embodiment of the present invention. The packet format 50 is for use with a bus following the USB 2.0 specification. Modifications may be made for other versions of the USB specification. As illustrated, the packet format 50 includes a number of fields across 32 bits. That is, the packet format 50 includes: a packet type (PT) field 52, a transmit/receive (T/R) field 54, a packet offload (OL) field 56, a reserved field 58, a total packet length field 60, a TCP/UDP Checksum End Length (TUCSE) field 62, a TCP/UDP Checksum Start Offset (TUCSS) field 64, a TCP/UDP Checksum Insert Offset (TUCSO) field 66, an IP Checksum End Length (IPCSE) field 68, an IP Checksum Start Offset (IPCSS) field 70, an IP Checksum Insert Offset (IPCSO) field 72, and a packet data (payload) field 74. In accordance with the new protocol, the packet format 50 would be used for transmissions from the host 16 to the UWB module 12 and from the UWB module 12 to the host 16, via the USB bus 14.

The PT field 52 identifies the type of packet being transferred. This may include, for example, whether the packet is a complete packet, a first packet in a series of packets, a second packet in a series of packets, a last packet in a series of packets, and so on. Additional packet type parameters could also be included. In at least one approach, complex field encoding is used to reduce the overall overhead for each packet. The T/R field 54 indicates whether the packet is associated with a transmit operation (i.e., the host 16 delivering data to a remote wireless entity) or a receive operation (i.e., the host 16 receiving data from a remote wireless entity). The OL field 56 identifies which functions are being offloaded to the UWB module 12. Support for a variety of different offload functions may be provided by the UWB module 12. This may include, for example, checksum calculation functions, network header functions, header compression functions, packet compression functions, packet encryption functions, aggregations of multiply packet functions, grouping of packets to the same destination, and others. The Internet Protocol defines a number of different kinds of packets (e.g., IP, IPv4, IPv6, etc.). Each of these packets may require a different set of offload functions to be performed before transmission. In one embodiment of the invention, the OL field 56 may include information identifying the kind of IP packet (or other packet) that is being processed. Upon reception of the packet from the USB 14, the UWB module 12 may read this information in the OL field 56 and then know the specific functions that need to be performed. In other approaches, the actual functions may be indicated within the OL field 56. The reserved field 58 is reserved for future use.

The total packet length field 60 identifies the total length of the entire packet, including all associated fragments, for a particular USB network transfer descriptor. If the PT field 52 indicates that the packet is a complete packet, then the total packet length field 60 will indicate the length of the present packet. If the PT field 52 indicates that the packet is one of a number of associated packets, then the total packet length field 60 will indicate the combined length of all associated packets.

The TUCSE field 62, the TUCSS field 64, the TUCSO field 66, the IPCSE field 68, the IPCSS field 70, and the IPCSO field 72 are all associated with the computation and processing of checksums within the UWB module 12. As is well known, a checksum in a communication system is an error detection technique that generates a sum by adding up some attribute of a message (e.g., the number of "ones" in the message, etc.) before transmission and appending the sum to the signal. Upon reception of the signal, the same sum can again be calculated and compared to the appended sum. If there is a difference in the two sums, then it may be assumed that one or more errors occurred during transmission. Both IP and TCP/UDP utilize specific procedures for calculating and transferring checksum values. When an IP packet utilizes TCP, an IP checksum will typically be calculated for the IP header itself. In addition, a TCP checksum may be calculated for the entire payload of the packet. The above-identified fields may be used to indicate how the checksums for a particular network packet should be handled.

The TUCSE field 62 indicates the length (e.g., in bytes) of the TCP/UDP payload over which the TCP/UDP checksum is to be calculated. A value of zero in the TUCSE field 62 indicates that the checksum calculation is to go to the end of the packet. The TUCSS field 64 indicates the offset of the TCP/UDP header from the start of the packet. This is the position where the TCP/UDP checksum calculation will commence. The TUCSO field 66 indicates the offset where the calculated TCP/UDP checksum value is to be inserted. The TCP/UDP checksum will typically be a 16 bit value. The IPCSE field 68 indicates the length of the IP payload over which the IP checksum is to be calculated. As with the TUCSE field 62, a value of zero in the IPCSE field 68 may be used to indicate that the associated checksum calculation is to go to the end of the packet. The IPCSS field 70 indicates the offset of the IP header from the start of the packet. This is the position where the IP checksum calculation will initiate. The IPCSO field 72 indicates the offset where the calculated IP checksum value is to be inserted. The IP checksum will typically be a 16 bit value. In at least one implementation, the TUCSE field 62 and the IPCSE field 68 are each two bytes in length and have a range from 0x0000 to 0xFFFF and the TUCSS field 64, the TUCSO field 66, the IPCSS field 70, and the IPCSO field 72 are each one byte in length and have a range from 0x00 to 0xFF. The packet data field 74 includes one or more octets of packet data being transferred.

It should be appreciated that the TUCSE field 62, the TUCSS field 64, the TUCSO field 66, the IPCSE field 68, the IPCSS field 70, and the IPCSO field 72 described above represent one technique for presenting checksum calculation parameters and checksum location information within a USB packet. Other techniques may alternatively be used.

Figure 6:
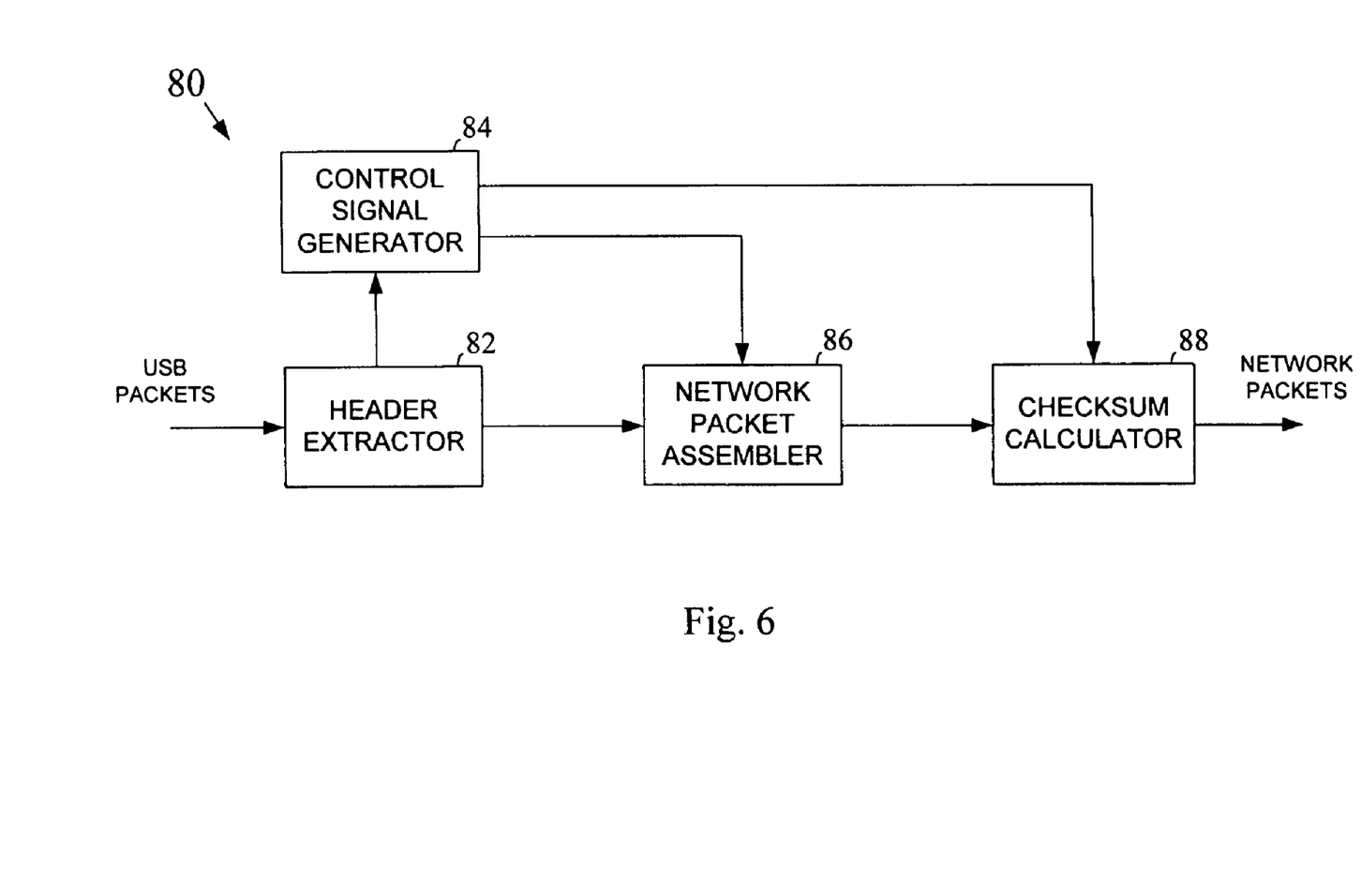
FIG. 6 is a block diagram illustrating example packet processing functionality that may be used within an UWB module during transmit operations in accordance with an embodiment of the present invention.

FIG. 6 is a block diagram illustrating example packet processing functionality 80 that may be used within an UWB module in accordance with an embodiment of the present invention. The packet processing functionality 80 may be used to process USB packets received from a host device in order to generate network packets for transmission into a wireless network medium. The packet processing functionality 80 may be used within, for example, the packet processor 22 of FIG. 2. As illustrated, the packet processing functionality 80 includes: a header extractor 82, a control signal generator 84, a network packet assembler 86, and a checksum calculator 88. The header extractor 82 receives packets from a host device, via a USB bus, and extracts certain headers from the packets. The packets may have the packet format 50 illustrated in FIG. 5 or a similar format (e.g., the packet generator 19 of FIG. 1 may be configured to generate USB packets having the packet format 50). The USB packet headers are delivered to the control signal generator 84 which uses the headers to develop control information to control the processing of the packets. The control signal generator 84 may read the PT field 52 of a present USB packet to determine whether the packet is a compete packet or one in a series of related packets. The control signal generator 84 may also read the OL field 56 of the packet to determine the packet header functions being offloaded. The control signal generator 84 may also read the total packet length field 60 to determine the length of the network packet to be generated. The control signal generator 84 may also read the TUCSE field 62, the TUCSS field 64, the TUCSO field 66, the IPCSE field 68, the IPCSS field 70, and the IPCSO field 72 to determine how to generate and insert the corresponding checksums. Once this information has been determined, the control signal generator 84 may begin to generate the appropriate control signals for the network packet assembler 86 and the checksum calculator 88.

The network packet assembler 86 begins to assemble the network packet to be transmitted into the wireless channel based on the control information received from the control signal generator 84. For example, if a first received packet indicates in its PT field 52 that it is a first packet in a series, then the network packet assembler 86 may temporarily store the data from the first received packet and wait for the remaining packets in the series to be received from the USB. When all of the associated USB packets have been received, the network packet will be assembled and delivered to the checksum calculator 88. Any offload functions to be performed within the UWB module, other than checksum functions, may also be performed by the network packet assembler 86. For example, the network packet assembler 86 may generate any packet headers required for the network packets. The network packets may include, for example, a medium access control (MAC) header, an IP header, a TCP/UDP header, an RTP header, a payload portion, and/or other components. Other packet constructions may also be used.

Control information from the control signal generator 84 may also be delivered to the checksum calculator 88 to describe how the various checksums are to be calculated for a particular network packet. For example, the control information may indicate a location within the network packet at which to begin an IP checksum, the length of data to process for the checksum, and the location to insert the IP checksum. The same may be done of the TCP/UDP checksum. All of the control information can be garnered from the USB packet headers. Based on the control information, the checksum calculator 88 may calculate the checksums and insert them in the appropriate places within the network packet. The network packet may then proceed to the wireless transmitter functionality for transmission into the wireless channel.

Similar processing may be performed in the reverse direction (i.e., during a receive operation) within the UWB module to segment received network packets for transmission over the USB bus. A network packet is first received by the UWB module from the wireless medium and the length of the packet is determined. The checksums within the received network packet may then be checked. If the checksums are valid, the UWB module 12 may then determine how many USB packets are necessary for carrying the associated information to the host 16. The UWB module 12 (e.g., the packet processor 22) may then segment the network packet into multiple portions and generate multiple USB packets for delivery to the host 16. The USB packets may have the packet format 50 of FIG. 5 or a similar format. When the USB packets are received by the host, the host may reassemble the packets. The reassembled packets may then be processed within the host 16 in the appropriate manner.

Figure 7:
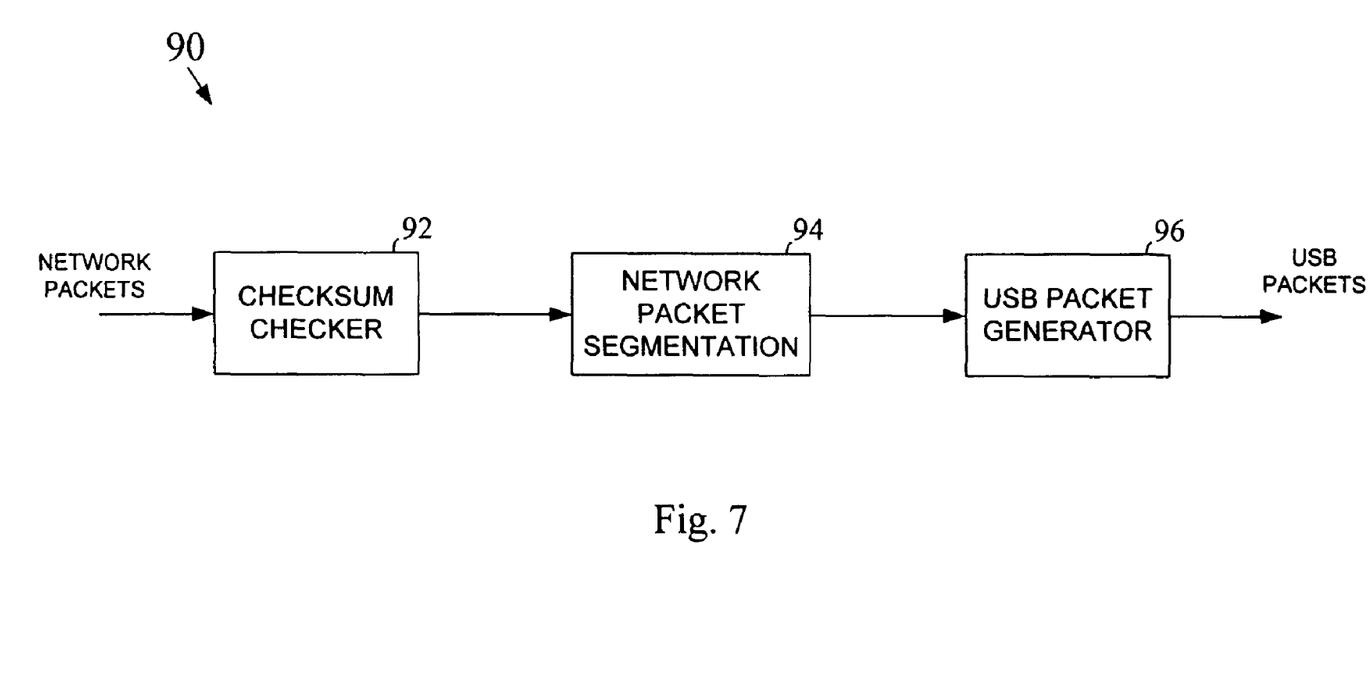
FIG. 7 is a block diagram illustrating example packet processing functionality that may be used within an UWB module during receive operations in accordance with an embodiment of the present invention.

FIG. 7 is a block diagram illustrating example packet processing functionality 90 that may be used within an UWB module in accordance with an embodiment of the present invention. The packet processing functionality 90 is for use in processing packets received from a wireless network medium to generate USB packets for delivery to an associated host device via a USB bus. As shown, the packet processing functionality 90 may include: a checksum checker 92, a network packet segmentation function 94, and a USB packet generator 96. The checksum checker 92 is operative for checking the checksum(s) within received network packets to determine whether the packets have been corrupted within, for example, the wireless channel. The network packet segmentation function 94 segments network packets into portions that will fit within USB packets without exceeding maximum packet length constraints. The segments are delivered to the USB packet generator 96 which generates USB packets for delivery to the host. In at least embodiment, the USB packets generated by the USB packet generator 96 have the packet format 50 illustrated in FIG. 5 (or a similar format).

Figure 8:
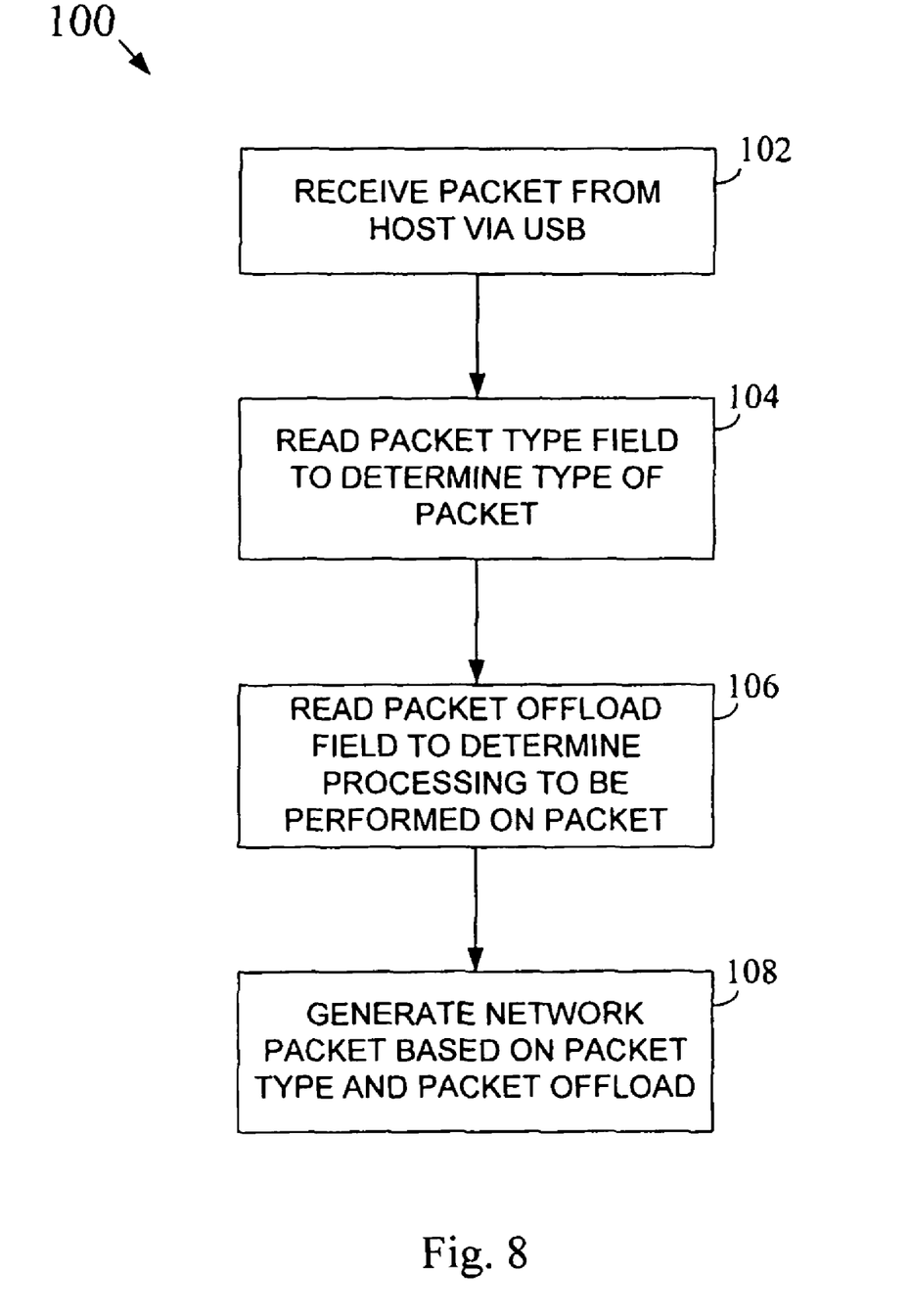
FIG. 8 is a flowchart illustrating an example method for use in processing packets within a UWB module in accordance with an embodiment of the present invention.

FIG. 8 is a flowchart illustrating an example method 100 for use in processing packets within a UWB module in accordance with an embodiment of the present invention. First, a USB packet is received from a host device via a USB (block 102). The PT field of the packet is read to determine the type of packet (block 104). The OL field of the packet is also read to determine the offload functions to be performed (block 106). A network packet is generated in accordance with the read information (block 108). This may include, for example, generating any network headers required for the network packet. The network packet that is generated may include data assembled from multiple different USB packets if the original USB packet is not a complete packet. In addition, various checksums may be calculated and inserted into the network packet. Other offload functions may also be performed.

In the embodiments described above, a USB bus is used to provide communication between a host device and an UWB module. It should be appreciated that features of the invention may also be used with other packet-based bus structures connecting a host and a wireless module.

In at least one embodiment, features of the invention are implemented as instructions and/or data structures stored on machine readable media. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein are functional in nature and do not necessarily correspond to discrete hardware elements. For example, in at least one embodiment, two or more of the blocks in a diagram are implemented together within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   receiving a plurality of universal serial bus (USB) packets defining a series of said USB packets from a host device via a USB;
   identifying a packet offload field of each of said plurality of USB packets to determine offload processing to be performed in connection with each of said plurality of USB packets;
   identifying a total packet length field of each of said plurality of USB packets to determine a total length of a network packet to be formed using said plurality of USB packets in said series;
   identifying a USB packet having a packet type corresponding to a first packet in said series of USB packets;
   identifying a USB packet having a packet type corresponding to a last packet in said series of packets;
   combining said plurality of USB packets in said series to generate a network packet for transmission into a wireless network channel based on said identified first packet in said series and said last packet in said series, said offload processing information, and said total packet length information.

2. The method of claim 1, further comprising:
   reading checksum calculation parameters from said first USB packet; and
   calculating at least one checksum value for said network packet based on said checksum calculation parameters.

3. The method of claim 2, further comprising:
   reading checksum location information from said first USB packet; and
   inserting said at least one checksum value into said network packet in a location indicated by said checksum location information.

4. The method of claim 1, wherein:
   generating a network packet includes generating at least one of: a medium access control (MAC) header, an Internet Protocol (IP) header, a transmission control protocol (TCP) header, a user datagram protocol (UDP) header, and a real time transport protocol (RTP) header.

5. The method of claim 1, wherein:
   said wireless network channel is an ultrawideband (UWB) channel.

6. An article comprising a non-transitory tangible storage medium having instructions stored thereon that, when executed by a computing platform, operate to:
   generate a plurality of universal serial bus (USB) packets defining a series of USB packets for delivery to an ultrawideband (UWB) module, wherein each of said plurality of USB packets include:
   a packet type field to indicate a packet type of each of said plurality of USB packets, said packet type indicative of a first packet in said series of USB packets or a last packet in said series of USB packets;
   an offload field to indicate one or more packet processing functions being offloaded to said UWB module in connection with each of said plurality of USB packets; and
   a total packet length field to indicate a total length of a network packet to be formed using said plurality of USB packets in said series of USB packets.

7. The article of claim 6, wherein:
   said network packet to be formed using said USB packet is a packet to be transmitted within an ultrawideband (UWB) wireless channel.

8. The article of claim 6, wherein at least one of said USB packets includes:
   checksum calculation parameters to be used by said UWB module to calculate at least one checksum value for said network packet.

9. The article of claim 8, wherein at least one of said USB packets includes:
   checksum location information to be used by said UWB module to determine where to insert said at least one checksum value within said network packet.

10. An article comprising a non-transitory tangible storage medium having instructions stored thereon that, when executed by a computing platform, operate to:
    obtain a plurality of USB packets defining a series of USB packets from a host device via a universal serial bus (USB);
    identify a packet offload field of each of said plurality of USB packets to determine offload processing to be performed in connection with each of said plurality of USB packets;
    identify a total packet length field of each of said plurality of USB packets to determine a total length of a network packet to be formed using said plurality of USB packets in said series;
    identify a USB packet having a packet type corresponding to a first packet in said series of USB packets;
    identify a USB packet having a packet type corresponding to a last packet in said series of packets;
    combine said plurality of USB packets in said series to generate a network packet for transmission into a wireless network channel based on said identified first packet in said series and said last packet in said series, said offload processing information, and said total packet length information.

11. The article of claim 10, wherein said instructions further operate to:
    read checksum calculation parameters from said first USB packet; and
    calculate at least one checksum value for said network packet based on said checksum calculation parameters.

12. The article of claim 11, wherein said instructions further operate to:
    read checksum location information from said first USB packet; and
    insert said at least one checksum value into said network packet in a location indicated by said checksum location information.

* * * * *